(No Model.) 2 Sheets—Sheet 1.

R. A. REISS & E. PETTENKOFER.
FIRE ESCAPE.

No. 395,455. Patented Jan. 1, 1889.

WITNESSES:

INVENTOR:
R. A. Reiss
E. Pettenkofer
BY Munn & Co.
ATTORNEYS.

N. PETERS. Photo-Lithographer, Washington, D. C.

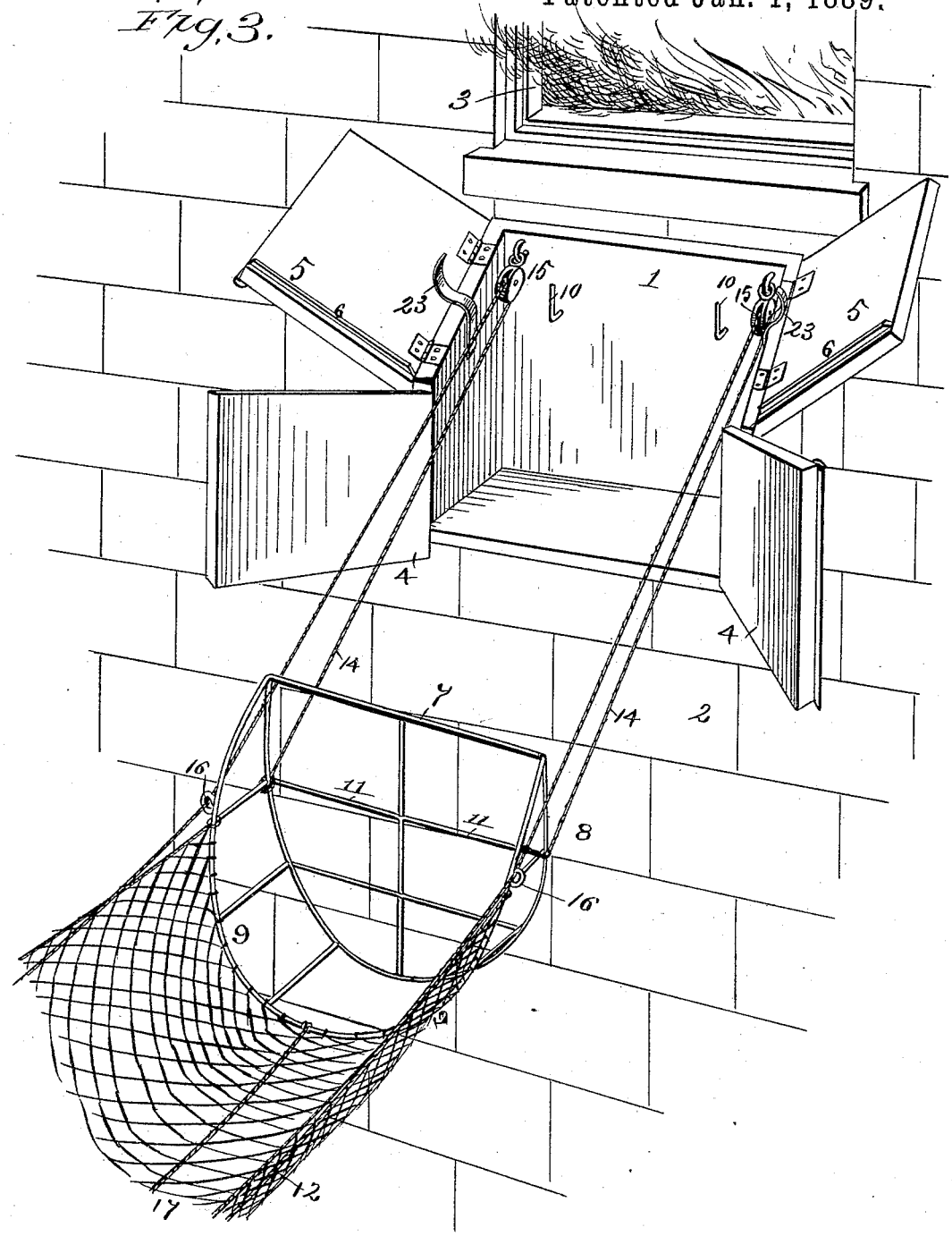

UNITED STATES PATENT OFFICE.

RUDOLPH A. REISS, OF HOBOKEN, NEW JERSEY, AND EDWARD PETTENKOFER, OF NEW YORK, N. Y.

FIRE-ESCAPE.

SPECIFICATION forming part of Letters Patent No. 395,455, dated January 1, 1889.

Application filed November 2, 1888. Serial No. 289,790. (No model.)

*To all whom it may concern:*

Be it known that we, RUDOLPH A. REISS, of Hoboken, in the county of Hudson and State of New Jersey, and EDWARD PETTENKOFER, of the city, county, and State of New York, have invented a new and Improved Fire-Escape, of which the following is a full, clear, and exact description.

This invention relates to that class of fire-escapes in which a flexible chute is employed, and has for its object to provide a fire-escape arranged on a building so as to be securely folded up and readily accessible when required for use, and which will be effective in use and durable.

The invention consists in a fire-escape constructed and arranged as hereinafter described and claimed.

Reference is to be had to the accompanying drawings, forming a part of this specification, in which similar figures of reference indicate corresponding parts in all the views.

Figure 1:
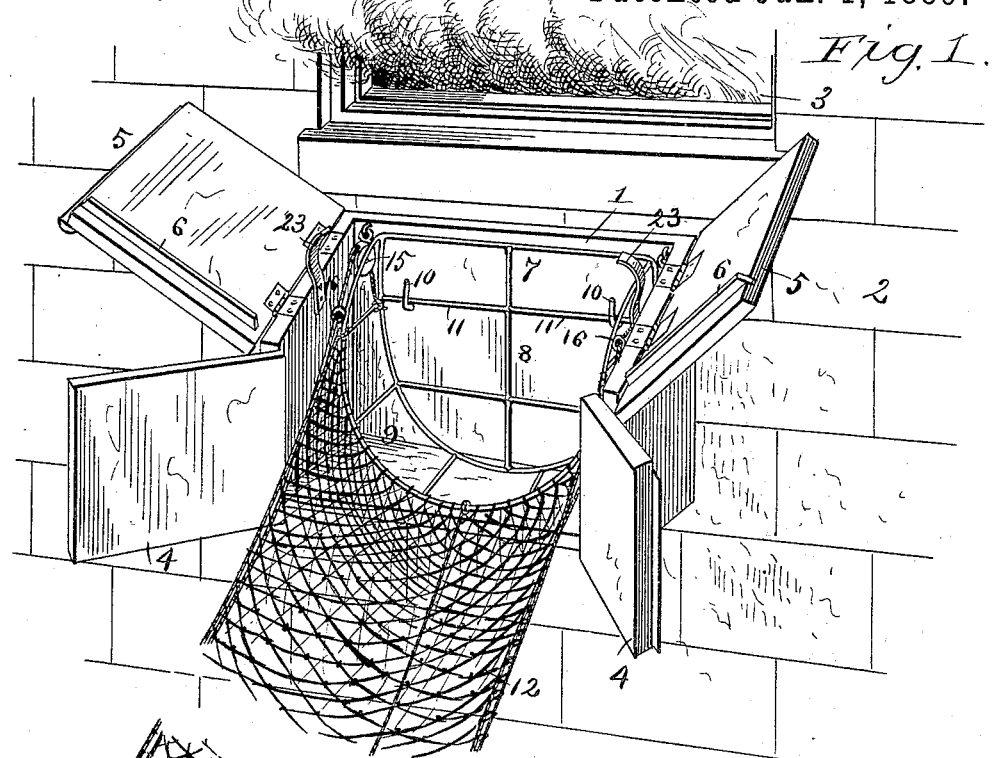
Figure 2:
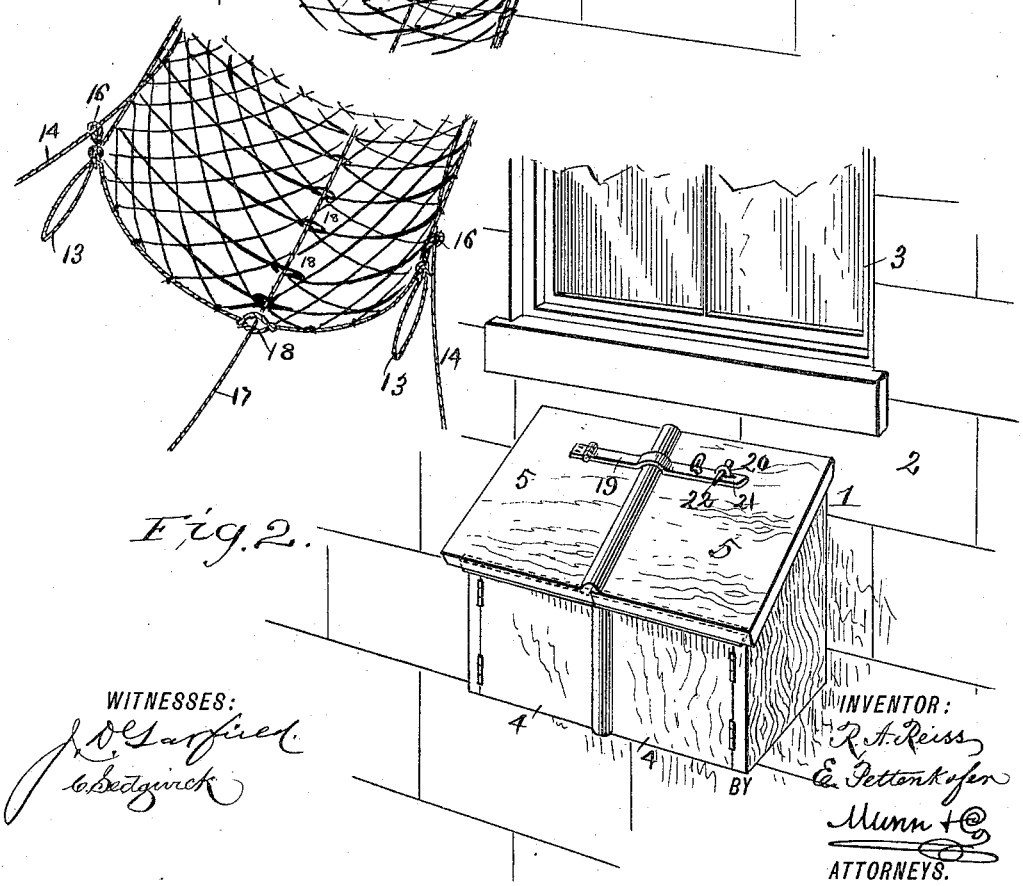

Figure 1 is a perspective view of the invention, with chute in extended position for use. Fig. 2 shows the casing containing the chute in closed position ready for use, and Fig. 3 is a view showing the manner of lowering the chute and its frame from its receptacle to preserve it when no longer required for use.

In carrying out this invention a casing or receptacle, 1, for a flexible chute is provided, constructed in any suitable manner and attached to the wall 2 of a building beneath a window, 3.

As shown, the receptable 1 preferably consists of a box having its front provided with hinged doors 4, and its top with hinged doors 5, having cleats 6 adjacent to their front edges, which overlap the top edges of the doors 5 when closed and hold them in closed position.

Within the casing 1 is located a frame, 7, preferably formed with the rear vertical portion, 8, and the front U-shaped portion, 9, and held in place in the casing 1 by means of hooks 10, engaging the horizontal rods 11 of the rear vertical portion, 8. To the front edge of the U-shaped portion 9 of frame 7 is attached a flexible chute, 12, of sufficient length to reach from the elevation at which casing 1 is located to the ground. The chute 12 is preferably made of netting, which renders it light and flexible and permits it to be easily handled when drawing it into and out of extended position. By having the upper end of chute 12 attached to the U-shaped portion of frame 7 the proper and desired shape— that of a U—is given to the chute in cross-section. By this means the person sliding in the chute will be securely held therein, and, owing to the flexibility of the netting, which readily conforms to the shape of the body, will be guided down the center of the chute. The chute 12 is provided at its lower end with loops 13 or other suitable form of hand-hold, by means of which the lower end of the chute is held up to form a gradual curve at the lower end, and thereby permit the person descending to easily pass out of the lower end of the chute.

To prevent the netting from burning, it may be saturated with some suitable non-combustible material.

After the inmates of the building have escaped the frame 7 and chute 12 may be preserved by detaching them from the casing 1. This is accomplished preferably by means of ropes 14, secured at one end to the sides of the frame 7, and passing over pulleys 15, attached to the top of the back of casing 1, and through rings or eyes 16 on frame 7 and in the sides of chute 12, and a rope, 17, secured at one end to frame 7 and passing down on the under side of chute 12 and extending to and beyond its lower end through rings or eyes 18.

If it is desired to draw down the chute 12 and frame 7 from the casing 1, a pull is first given to the ropes 14, which raises the horizontal rod 11 of frame 7 out of engagement with hooks 10. The frame 7 and chute 12 are then drawn down by pulling on the cord 17, the cords 14 being permitted to run up and through the pulleys 15.

If it is desired to draw back the frame 7 and chute 12 to place, it may be done by pulling on the ropes 14, which will carry the frame 7 back into the casing 1 and bring horizontal rods 11 into engagement with hooks 10. The doors 5 are held shut when the casing 1 is closed by any suitable fastening device, and, as here shown, consisting of a hasp, 19, hinged to one of the doors 5, overlapping the other door 5, and secured by a staple, 20, projecting through a slot, 21, in the hasp 19, and held by a pin, 22, projecting through the staple 20.

Upon releasing the hasp 19 and lifting it back, the doors will be thrown up and back by suitable springs, 23, as shown in Fig. 1, when the weight and pressure of the chute 12 on doors 4 will throw the latter open, and the chute, with its ropes 14 and 17, will fall to the ground. Its lower end may then be seized and held in proper position by the loops 13, the chute being in an inclined position from the window. The ropes 14 and 17, in addition to being used for lowering the frame and chute, serve also to brace and support the chute.

By means of this invention a serviceable, light, effective, and durable fire-escape is provided. It will be understood that a casing 1, with chute 12 and the other parts, all as herein set forth, may be placed beneath each window in a building.

We are aware that fire-escapes provided with automatically-opening casings are old, and also that in fire-escapes detachable chutes and means for detaching them are old, and that a canvas tube serving as a fire-escape chute with a frame for holding one end thereof open is old; and in this connection we are aware of Patents No. 193,489, July 24, 1877; No. 200,260, February 12, 1878, granted to Ira D. Cross; Patent No. 288,394, November 13, 1883, granted to E. H. Bailey, and No. 208,944, October 15, 1878, granted to V. Wohlmann, and to such construction as shown in any of these patents we make no broad claim.

Having thus described our invention, what we claim as new, and desire to secure by Letters Patent, is—

1. A fire-escape consisting of a casing with automatically-opening doors attached to a building, a frame with a U-shaped front projection detachably secured in the casing, with a trough-shaped chute attached at one end to the U-shaped projection, which gives the chute a U-shaped or trough form, and ropes extending lengthwise of and beyond the chute for detaching the frame from the casing and drawing it down therefrom, substantially as shown and described.

2. A fire-escape chute constructed of netting and having secured at one end a frame formed with a U-shaped portion, to which the end of the chute is secured, giving it a U or trough shape, and a vertical rear portion adapted to engage retaining devices in a receptacle, substantially as described.

3. A fire-escape consisting of a casing attached to a building and formed with self-opening doors in front and spring-actuated opening-doors on top, a frame held in the casing by hooks and having a U-shaped front projection, a chute of netting secured at one end to the U-shaped projection and having hand-holds at its lower end, and ropes for detaching the frame from the retaining-hooks, which ropes pass over pulleys in the casing and through guides in the sides of the chute to and beyond its lower end, and a rope for drawing down the frame, and netting connected to the frame extending beneath the chute and through guides therein and beyond the lower end of the chute, substantially as shown and described.

RUDOLPH A. REISS.
EDWARD PETTENKOFER.

Witnesses:
JOHN P. NICHOLS,
FRANK VARIAN.